United States Patent [19]

Van Noten

[11] Patent Number: 4,860,799
[45] Date of Patent: Aug. 29, 1989

[54] CLOSURE FOR WRAPAROUND SLEEVE

[75] Inventor: Louis Van Noten, Leuven, Belgium

[73] Assignee: Raychem Corporation, Menlo Park, Calif.

[21] Appl. No.: 183,515

[22] Filed: Apr. 14, 1988

Related U.S. Application Data

[63] Continuation of Ser. No. 71,536, Jul. 9, 1987, abandoned, which is a continuation of Ser. No. 920,493, Oct. 17, 1986, abandoned.

[30] Foreign Application Priority Data

Oct. 21, 1985 [GB] United Kingdom ............... 8525910

[51] Int. Cl.⁴ .......................................... F16L 11/12
[52] U.S. Cl. .................................... 138/167; 138/99; 138/103; 138/110; 138/128; 174/DIG. 8
[58] Field of Search ............... 138/99, 103, 128, 110, 138/151, 156, 157, 161, 164, 165, 167, 168, 169, 170, 178, DIG. 4, DIG. 10; 174/DIG. 8, DIG. 11; 156/86; 428/35, 36, 99; 24/336, 16 PB, 255 R, 255 BS, 255 SL, 257, 243 R

[56] References Cited

U.S. PATENT DOCUMENTS

| | | | |
|---|---|---|---|
| 2,691,293 | 10/1954 | Patterson | 24/336 |
| 3,455,336 | 7/1969 | Ellis | 138/158 |
| 4,087,190 | 5/1978 | Haeder | 138/99 |
| 4,123,047 | 10/1978 | Koht et al. | 174/DIG. 8 |
| 4,364,419 | 12/1982 | Nolf | 138/167 |
| 4,379,473 | 4/1983 | Kunze | 138/99 |

FOREIGN PATENT DOCUMENTS

| | | |
|---|---|---|
| 0074280 | 3/1983 | European Pat. Off. . |
| 7601613 | 5/1976 | Fed. Rep. of Germany . |
| 8227046 | 1/1983 | Fed. Rep. of Germany . |
| 2402098 | 3/1979 | France . |
| 2422275 | 12/1979 | France .......... 174/DIG. 8 |

Primary Examiner—James E. Bryant, III
Attorney, Agent, or Firm—A. Stephen Zavell; Herbert G. Burkard

[57] ABSTRACT

A wraparound sleeve has closure members, typically in the form of upstanding rails, at its longitudinal edges. A channel having a discontinuity along its length is positioned over the closure members to hold the sleeve in a closed configuration. A clip is positioned between the closure members and the channel to bridge the discontinuity in the channel.

The discontinuity in the channel preferably extends through the channel entirely, so that the channel is in two or more parts, which can be installed end to end.

The discontinuity in the channel aids installation, particularly where the closure to be formed is of long length.

8 Claims, 2 Drawing Sheets

CLOSURE FOR WRAPAROUND SLEEVE

This application is a continuation of application Ser. No. 920,493, filed Oct. 17, 1986, now abandoned, which is a continuation of application Ser. No. 071,536, filed July 9, 1987, now abandoned.

BACKGROUND OF THE INVENTION

The present invention relates to a closure for a wrap-around sleeve, particularly for a recoverable sleeve and particularly for use in the cable accessories field.

Sleeves may be used in many instances where elongate substrates such as cables or pipes or splices or joints therein are to be sealed, insulated or otherwise environmentally protected. In order to provide environmental protection, the sleeve may be provided with an adhesive or sealant, may be dimensionally-recoverable (particularly shrinkable, especially heat-shrinkable), may be provided with mechanical means to cause it to engage the substrate, or two or more of these features may be provided.

Where an end of the substrate is not accessible or where space is limited, installation of a tubular sleeve closed in cross-section may be impossible or difficult. For such situations, wrap-around sleeves have been developed. A wrap-around sleeve is simply an article generally of a plastics material such as a polyolefin, having means for securing it in a wrappedaround configuration. In particular such a sleeve may comprise a sheet of a flexible recoverable plastics material having an adhesive on a surface that will be inwardly facing when installed.

A recoverable wrap-around sleeve of particular use for enclosing joints in pipes or splices in telecommunications or power cables is disclosed in U.S. Pat. No. 3,455,336. The sleeve therein disclosed has an upstanding protrusion, known generally as a rail, running along each of two opposing edge regions. A channel, generally C-shaped in transverse cross-section, may be slid over the rails to hold them together and thus to hold the sleeve in its wrapped-around configuration. The rails may be undercut adjacent the surface of the sleeve such that the channel can be slid onto the rails longitudinally rather than pushed over transversely; the reason of course is so that the channel can grip the rails to prevent the rails pulling out of the channel due to the force of recovery of the sleeve or to other mechanical forces tending to separate the rails.

Such a channel is in general perfectly satisfactory, although difficulty can be experienced when the sleeve, and consequently also the channel, is very long, say at least 60 cms, especially at least 80 cms, particularly at least 100 cms. The difficulty arises partly because of the friction between a long sleeve and a long channel, and partly because of the space required which must accomodate the length of the sleeve and of the channel. The second problem may be reduced if the channel is flexible such that it can be longitudinally bent.

DESCRIPTION OF THE INVENTION

A solution to these problems is to provide the channel in two or more lengths, which will lie, of course, end-to end over both rails in the installed product. We have discovered that this may result in two further problems. Firstly, the two (or more) channels may not be aligned when the product is installed, and secondly stresses can be built up in the sleeve due to a discontinuity along the undercut potions of the rails. We have overcome these problems by the use of a clip.

Thus, the invention provides an assembly for environmentally sealing a substrate which comprises:

a wrap-around sleeve having closure members adjacent opposing edge portions thereof, which members can be held together to hold the sleeve in a wrappedaround configuration;

a closure channel which can be positioned over the closure members thereby holding them together, the channel having a discontinuity along its length;

and a clip that can bridge the closure members at a position between the channel and the closure members and bridging the discontinuity in the channel.

The invention also provides a method of environmentally sealing a substrate, which comprises:

positioning around the substrate a sleeve having closure members adjacent opposing edge portions thereof, which members can be held together to hold the sleeve in a wrapped-around configuration;

positioning a clip on the sleeve bridging the closure members; and positioning a closure channel having a discontinuity along its length over the clip and over the closure members thereby holding the closure members together, the channel being positioned such that the clip bridges the discontinuity.

The discontinuity in the channel is preferably complete i.e the channel comprises two or more parts to be installed end-to-end. It may however be only partial, provided perhaps to increase flexibility of the channel which is useful if the substrate to be protected is of non-uniform cross-sectional size.

The sleeve is preferably dimensionally-recoverable, more preferably heat-shrinkable. Also, the sleeve preferably has an internal coating of a sealing material, for example a hot-melt adhesive.

In the method of the invention, the clip may be formed in situ or preformed from sheet material, such as metal, of sufficient strength. In either case, the sheet material may be of size 1.0–15 cms by 2–8 cms (particularly about 4 cm by 4 cms) and preferably 0.05–1 mm, particularly about 0.2 mm thick. Where it is installed in situ it may be placed over the rails or other closure members and bent around them to conform to their profile. Such bending may be done by hand, or may be aided with a pair of pliers or other tool. The closure channel may then be slid over the rails and over the clip. Where the clip is pre-shaped it may be slid onto the closure members from one end thereof or it may be snapped over them. In this second possibility the clip may be resilient.

The closure members of the sleeve are preferably in the form of rails, i.e. protrusions adjacent the edges of the sleeve which run longitudinally along the edges, generally continuously. Such protrusions, as mentioned above, may be undercut at their base, preventing lateral movement of the channel off the rails. We prefer that the clip has a cross-sectional shape generally corresponding to that of the rails and in particular we prefer that the clip extends to the undercut portion of the rails adjacent the surface of the sleeve. This feature reduces stress in the sleeve at the position of the clip, ie at that position where there is a discontinuity in the closure channel. Preferably the clip, at least when installed, has substantially the same cross-sectional shape as that of the channel. Before installation, the clip may have a narrower neck and be snapped over the rails, its resilience helping to keep it in place and/or helping to hold the rails together prior to installation of the channel.

The assembly of the invention is particularly useful for forming a telecommunications cable splice, in which case it is preferably used in conjunction with a liner provided with means such as crowned ends to accomodate the transition in cross-section between the smaller cables and the larger intermediate splice. Where a cable branch is to be protected by the splice case, a branch-off clip may be provided over an end of the sleeve between the branching cables to help seal the crutch region between the cables.

BRIEF DESCRIPTION OF THE DRAWINGS

The invention is further illustrated with reference to the accompanying drawings, in which.

DETAILED DESCRIPTION OF THE INVENTION

Figure 1:
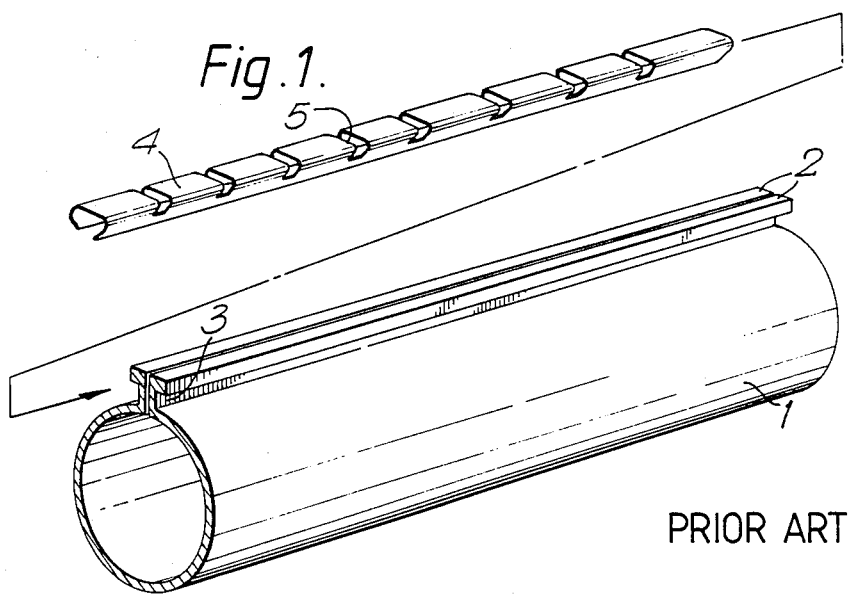
FIG. 1 shows a prior art wraparound sleeve and closure channel.

FIG. 1 shows a prior art wraparound sleeve 1 which may be used to enclose a telecommunications cable splice or other substrate (not shown). The sleeve has closure members 2 in the form of longitudinal protrusions shaped as rails, adjacent each of two opposing edges of the sleeve. One closure member 2 may usefully be spaced a short distance from an edge, to provide a flap that underlies the closure members 2 when the sleeve is closed. The closure members 2 may have an undercut region 3 in order that a closure channel 4 may be slid longitudinally over them (as illustrated by the arrow) but may not be detached in a radial direction. The closure channel 4 may have slots 5 or other means for increasing longitudinal flexibility. When the sleeve is installed over a cable splice, especially when it is dimensionally recovered over a splice, the closure members and channel desirably conform to the shape of the splice. Hence the preference for flexibility.

Figure 2:
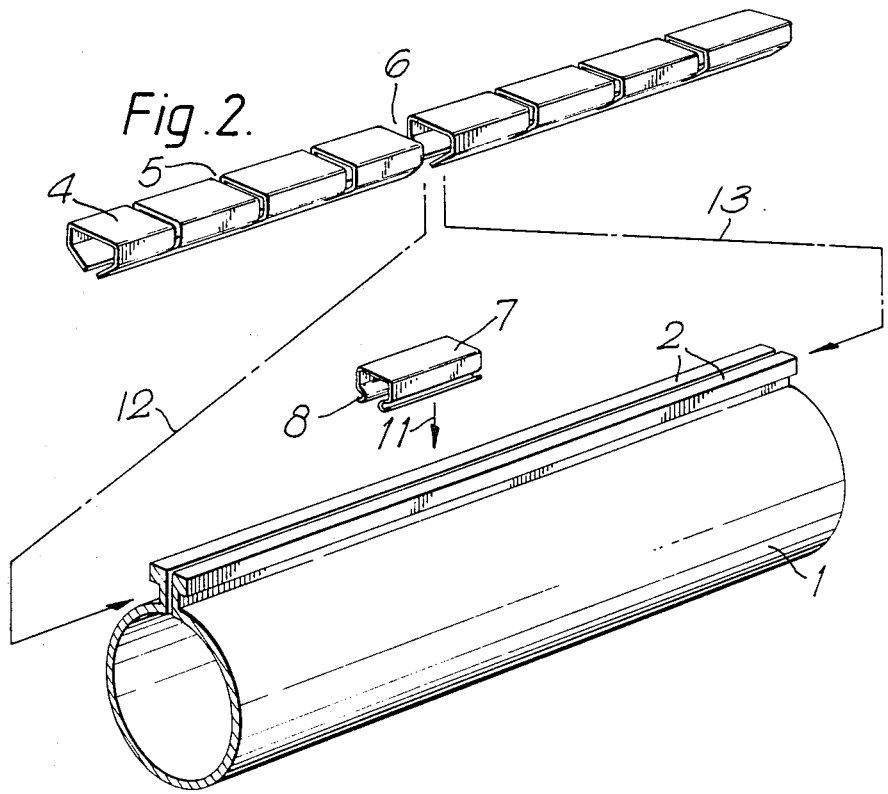
FIG. 2 shows an assembly of the invention in perspective view.

An assembly of the invention is illustrated in FIG. 2. Again, a wraparound sleeve 1 has closure members 2. The closure members need not have the shape illustrated, and in particular different cross-sectional shapes may be provided. For example the members 2 may be produced by wrapping edge portions of the sleeve around a rod or other longitudinally arranged member, in which case they may have a more rounded shape. Also, the channel need not have the shape or form illustrated and could for example be made of wire or rods rather than sheet material.

In the embodiment illustrated, the closure channel 4 has a discontinuity 6 that extends entirely through the closure channel, the channel therefore being in two parts. These two parts can if desired be installed by sliding over the closure members 2, one from each end as indicated by the arrows 12 and 13. Alternatively, both channels may be slid over the members 2 from the same end. A further possibility is that the channel comprises a resilient material or the width of its longitudinal opening can otherwise be altered such that the channel can be installed radially with respect to the sleeve. In any case, the two parts preferably rest endto-end when installed, although a gap may remain between them.

If the two parts were installed merely as indicated above (i.e. without use of the clip 7) there is a danger that the two parts will become misaligned and that stresses will build up in the sleeve at the discontinuity, perhaps causing the sleeve to wrinkle or otherwise to become irregularly installed. This is a particular problem where the sleeve is dimensionally recoverable, especially heat-shrinkable. We have found that use of a clip, such as clip 7, but positioned over an installed channel is not completely successful; although channel alignment may be achieved, it is still difficult satisfactorily to reduce stresses in the sleeve.

In the method of the present invention, the clip is installed under the closure channel, and in the assembly of the invention the clip, the channel and the closure members are so sized that the clip can fit between the closure members and the channel.

The method of the invention may be carried out as indicated by arrows 11, 12 and 13. Firstly, the clip 7 is positioned over the closure members 2. The clip may have upturned edges 8. The clip 7 may be formed from resiliently deformable material such that it can be snapped over the members 2, as indicated by the arrow 11. It may, however, be installed by sliding over the members 2 from one end. A further alternative is that it is shaped in situ. Here a plain flat piece of sheet material, or a partially preformed clip, is positioned over the rails and then bent around the rails to the desired shape. After the clip has been positioned, the closure channel is then positioned as described above. Where the sleeve is long, positioning of the clip 7 may serve temporarily to hold the members 2 together to aid positioning of the channel 4.

Figure 3:
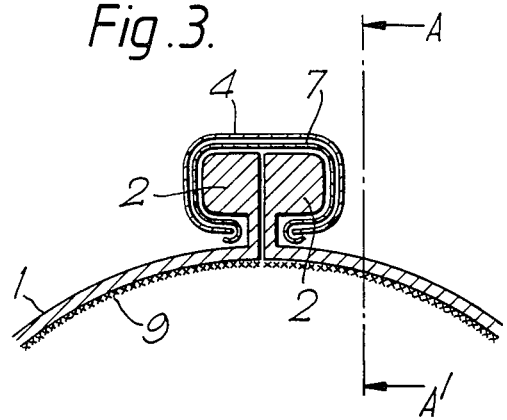
FIG. 3 is a cross-section through the closure members, clip and closure channel of an installed assembly of the invention.

A transverse cross-section through the closure members, clip and closure channel of an assembly of the invention is shown in FIG. 3. In the embodiment illustrated, an adhesive, for example a hot-melt adhesive, is provided as an internal coating on the sleeve 1. A clip 7 can be seen between the closure members 2 and the closure channel 4.

Figure 4:
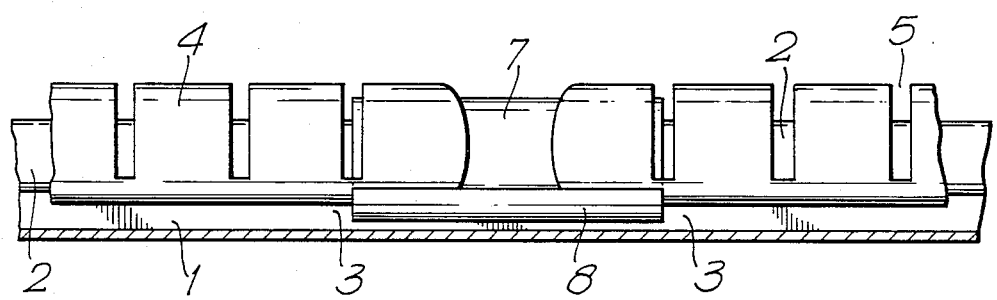
FIG. 4 is a partial side elevation of an installed assembly of the invention.

FIG. 4 is a section through the sleeve taken along line A-A¹ of FIG. 3, showing the closure in side elevation. In FIG. 4 an upturned edge 8 of the clip 7 is shown extending over the lower edge of the channel 4. The clip 7 can be seen to bridge the discontinuity 6 in the channel 4. Stresses at the undercut region 3 of the rails 2 are spread by the clip.

I claim:

1. An assembly for environmentally sealing a substrate which comprises:

a wraparound dimensionally-recoverable sleeve having closure members comprising rails hoving bases with the rails undercut at their respective bases adjacent opposing edge portions thereof, which members can be held together to hold the sleeve in a wrap-around configuration;

an elongate closure channel that is generally cshaped in transverse cross-section and is positioned over the closure members thereby holding them together and being resistant to lateral removal therefrom due to its c-shape, the channel having a discontinuity along its length, the discontinuity extending through the channel entirely such that the channel is in two or more separate parts which may be positioned end-to-end, each over both closure members; and a clip installed over and gripping both closure members at a position between the channel and the closure members and bridging the discontinuity in the channel.

2. An assembly according to claim 1, in which the sleeve has an internal layer of a sealing material.

3. An assembly according to claim 1, in which the clip comprises a resiliently deformable material, said clip installed by snap fitting over the closure members.

4. An assembly for environmentally sealing a substrate which comprises:

a wraparound dimensionally recoverable sleeve having opposed edge closures members, said edge closure members capable of being held together in a wraparound sleeve configuration by a c-shaped elongate closure channel;

at least two substantially c-shaped elongate closure channels, said closure channels can be positioned over said closure members thereby holding said closure members together and being resistant to lateral removal therefrom; and a clip installed over and gripping said closure members at a position between said closure channels to bridge said closure channels.

5. An assembly according to claim 4, wherein said clip comprises a resiliently deformable material permitting said clip to be snap-fit over said closure members.

6. An assembly according to claim 4 wherein said clip includes opposing upturned edges capable of accepting the opposing edges said closure members.

7. A method of environmentally sealing a substrate which comprises:

positioning around the substrate the opposing edge portion closure members of a dimensionally recoverable sleeve, said closure members shaped to accept a clip and at least two substantially cshaped elongate closure channels;

positioning said clip on said closure members so that said clip can contact the closure channels and grip the closure members; and positioning the closure channels on said closure members in bridging contact with said clip.

8. The method according to claim 7 wherein said clip snap-fits over said closure members and said closure channels slide along said closure members into bridging contact said clip.

* * * * *